Oct. 28, 1952         L. C. BARLING ET AL         2,615,174
                     FLOAT-OPERATED MECHANISM

Filed July 25, 1950                          2 SHEETS—SHEET 1

Inventors
L. C. Barling
G. R. Beith
By Glascock Downing Seebold
Attys

Oct. 28, 1952   L. C. BARLING ET AL   2,615,174
FLOAT-OPERATED MECHANISM

Filed July 25, 1950   2 SHEETS—SHEET 2

Inventors
L. C. Barling
G. R. Beith
By Hasenk Downing Seibold
Attys.

Patented Oct. 28, 1952

2,615,174

UNITED STATES PATENT OFFICE 2,615,174

FLOAT-OPERATED MECHANISM

Leslie Clement Barling and George Russell Beith, Johannesburg, Transvaal, Union of South Africa Application July 25, 1950, Serial No. 175,692
In the Union of South Africa May 26, 1950

4 Claims. (Cl. 4—67)

This invention relates to float-operated mechanisms, and has particular reference to mechanisms of that type as made for use in connection with automatic valves, e. g., flushing valves for automatically and intermittently flushing public urinals and the like.

In the case of float-operated mechanisms hitherto proposed, the mechanism when it is operated, is caused to move only gradually, in correspondence with the gradual rise of liquid in the cistern or other vessel with which the mechanism is associated and the corresponding gradual movement of the float. The consequence of such operation, in the case of a flushing valve is that the discharge of liquid from the cistern, at the commencement at least of the discharge, is comparatively weak and low. The flushing action is, therefore, inefficient as compared with that obtainable in the case of a manually operated flushing valve.

The object of our invention is to provide means whereby a more rapid operation can be obtained with float-operated mechanisms, and whereby in the case of float valves used for flushing purposes, the flushing action is rendered more powerful and efficient.

According to the invention, we provide a float-operated mechanism which comprises in combination with a control member to be operated in accordance with the variation of liquid level in a vessel (e. g. in the case of a float-operated valve, a valve member) a float device adapted to be acted on by rise of liquid in the vessel, a unidirectional transmission device operating the control member conjointly with the float device on upward movement thereof and permitting also the independent return of the control member, a lift device adapted to be acted on by rise of liquid rising in the vessel at a stage subsequent to the commencement of the action of the liquid on the float device, and a trip means constituted by interengaging elements provided on the float device and the lift device and adapted to detain the float device in an initial position and release the float device from that position immediately the lift device is actuated by the rise of the liquid level in the vessel to its predetermined maximum so as to impart from the float device to the control member an abrupt kick or operating movement, and adapted also to become reset under gravity on the liquid level returning to its minimum.

The float device may comprise a counterbalanced lever which is supported between its ends on a fixed pivot (e. g. in the case of a float-operated valve, a pivot mounted on the seat member or other fixed part of the valve or of the cistern), and which is provided with a hollow float at one end, and with a counterbalancing weight and one element of the trip means, at the other end.

The lift device may comprise an inverted cup or bell so that, as the water level rises, air will be trapped in the bell and become lightly compressed therein, and will act as a compressed spring, so as to impart an extra initial impetus to the lift device in order to disengage the elements of the trip means. In a preferred construction, the lift device comprises a non-counterbalanced lever which is supported between its ends by a fixed pivot (e. g. in the case of a float-operated valve, a pivot mounted on the seat member or other fixed part of the valve or cistern), and which is provided with an inverted cup or other air bell or auxiliary float at one end and with the other element of the trip means at the other end.

The element of the trip means on the counterbalanced lever may comprise a roller or other detent member, and the element on the non-counterbalanced lever may comprise an arcuate or other notch in which the roller or other detent is adapted to be held by the gravity action of the inverted cup or other air bell or auxiliary float, so long as the latter is not actuated by the liquid.

The unidirectional transmission device provided between the control member and float member may comprise a link which is slidable in a seating or guide provided therefor on the counterbalanced lever and is connected at its one end to the control member and provided at its other end with an abutment or head whereby it can be operated by the counterbalanced lever when this lever is released and thrust upwards as aforesaid on disengagement of the trip elements. Preferably, the link is extended beyond the seating or guide therefor when the counterbalanced lever is in its normal or detained position, so that the abutment or head is located a short distance away from the seating or guide for the link in order to provide between the upward movement of the said lever and the movement of the control member, a corresponding amount of lost motion. In this manner it is ensured that the elements of the trip means are properly disengaged before the float device is burdened with the operation of the control member.

An embodiment of the invention as applied to a float-operated mechanism for automatic flushing valve will now be described, by way of example, with reference to the accompanying drawings, in which—

Referring to the drawings—

Figure 1:
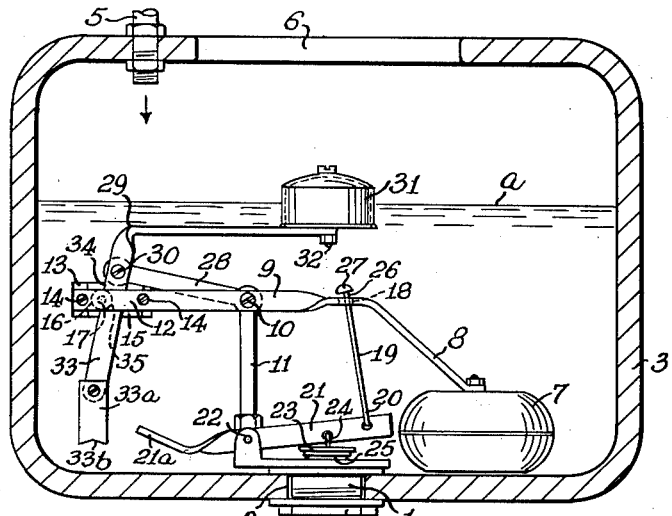
Fig. 1 is a view of the mechanism and valve in elevation, with the parts in the lower or closed position, and the cistern shown in section.
Figure 2:
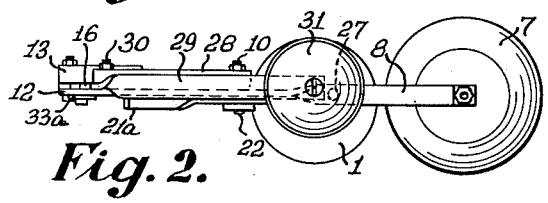
Fig. 2 is a corresponding view of the mechanism in plan, without the cistern.

The valve body 1 is mounted in the opening 2 provided in the base of the cistern 3 by means of a nut 4 which, as shown, is screw-threaded on the valve body. At the top, the cistern is provided with a water-inlet 5, and a central opening 6 leading to the atmosphere.

A hollow float 7 is fixed upon one end 8 of a lever 9. This lever is mounted on a pivot 10 carried by a standard 11 supported on the valve body 1. At the opposite end 12 of the lever 9, a counterbalancing weight or block 13 is mounted by means of screw-bolts 14. The block 13, at the side thereof innermost or adjacent to the end 12 of the lever 9, is formed with a recess or groove 15. At the outer end of the recess 15, a roller 16 is mounted on a pin 17.

Adjacent to the end 8 of the lever 9, a vertical guide hole or seating 18 is formed, which is adapted to accommodate freely the upper end of a link 19. The lower end 20 of the link 19 is hingeably connected to a valve lever 21, which is mounted on a fixed pivot 22. A valve or control member 23 is hingeably connected to one end of the lever 21 by means of a hook 24, so that the valve member 23 can be raised from, and lowered on to a valve seat member 25. The other end of the lever 21 is formed with an upwardly inclined step 21a. The link 19 is extended upwards so that, when the valve is in the closed position as shown in Fig. 1, there is a short extension 26 above the top surface of the lever 9. At the top of this extension 26, an abutment or head 27 is formed, which is greater in diameter than the hole or seating 18.

The standard 11 is formed with a side arm 28, which is inclined slightly upwards, e. g. about 10° to the horizontal. At the outer end of the arm 28, a bent lever 29 is mounted on a pivot 30. An inverted cup or air bell 31 constituting a lift member is secured by a vertical screw-bolt 32 to the upper end of the lever 29.

The lower end 33 of the bent lever 29 extends freely downwards between the end 12 of the lever 9 and the block 13, through the recess 15. In the outer edge 34 of the lever 29, adjacent to the roller 16, an arcuate notch 35 is formed. This notch is so dimensioned that the roller 16 and notched part of the lever 29 are adapted to fit snugly, but displaceably, into one another. The end 33 of the lever 29 carries a pendulous trigger member 33a, the bottom edge 33b of which may be of inverted V shape. The end 33, however, is not counterweighted to balance the bell 31, so that normally the notch 35 is firmly held, by the gravity action of the bell 31, in engagement with the roller 16. By virtue of such engagement, the counterbalanced lever 9 is normally maintained in the horizontal position shown in Fig. 1.

Figure 3:
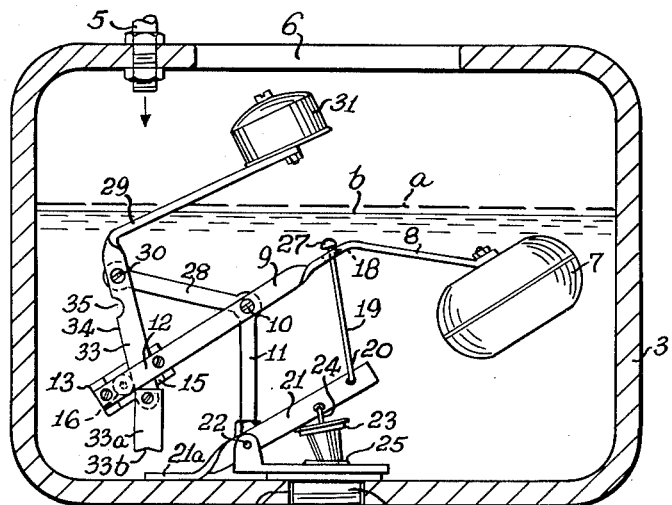
Fig. 3 is a similar view to that shown in Fig. 1, with the parts in the upper or open position.
Figure 4:
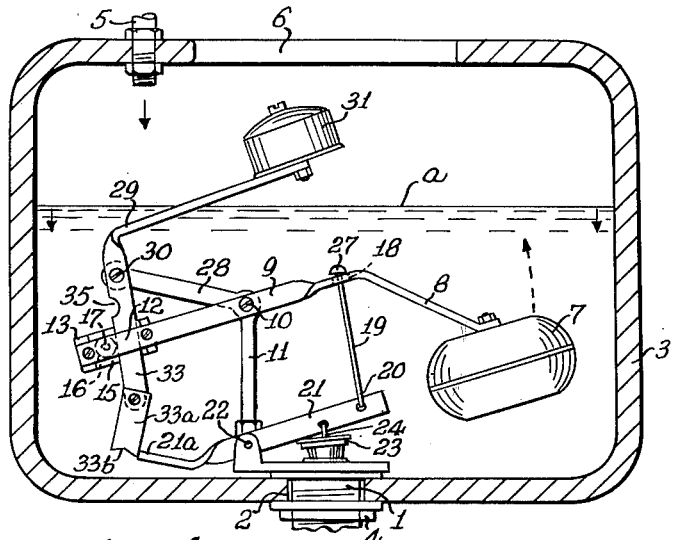
Fig. 4 is a similar view, showing an intermediate stage in the rising or opening movement of the mechanism.

In the operation of the valve, when the water in the cistern 3 has been discharged, the continued entry of water into the cistern through the water-inlet 5 causes the water-level in the cistern to rise. At this stage, the valve member 23 is in its closed position on the valve seat 25 and the operating parts are in the position shown in Fig. 1. As the water-level rises, the float 7 is first rendered buoyant by the water in which it becomes submerged. The float 7 is prevented from rising, however, by the trip means constituted by the interengaging roller 16 and notch 35. As the water-level further rises, the water rises in and around the air bell or auxiliary float 31. At a predetermined level (represented by the line a in Figs. 1 and 4), the upthrust of the water on the bell or lift member 31 becomes effective to tilt the bent lever 29 in an anti-clockwise direction to the position shown in Fig. 4. The notch 35 is thereby disengaged from the roller 16. Thereupon the counterbalanced lever 9— being now released — is abruptly tilted anti-clockwise to the position shown in Fig. 3 by the whole upthrust or stored-up buoyancy of the float 7. In this movement, the end 8 of the lever 9 first moves freely or with lost motion to cover the short distance between the top surface of the seating 18 and the head 27 of the link 19. This will ensure that complete disengagement of the notch 35 and roller 16 takes place before the lever 9 contacts the head or abutment 27. Thereafter the lever 9 kicks the link 19 upwards, which lifts with an accelerated action the valve member 23. The valve is thereby opened almost instantaneously and the water-level immediately begins to fall (compare the water-level lines a and b in Fig. 3). A quick and powerful discharge of water through the valve opening is thus obtained, with maximum effectiveness for flushing of the public urinal or the like with which it is used.

Figure 5:
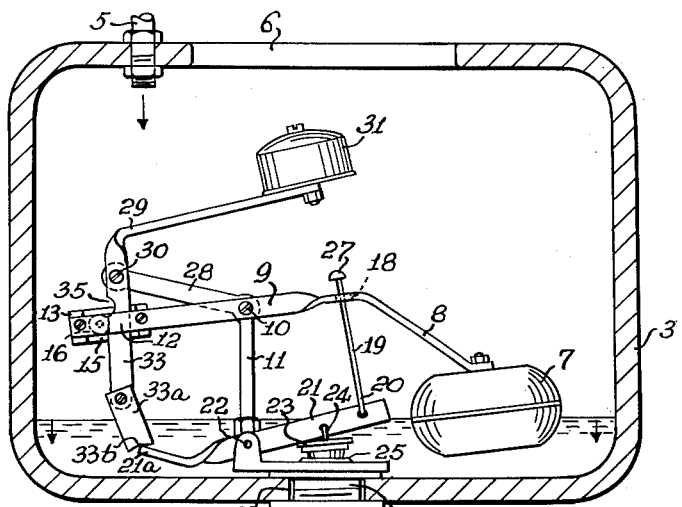
Fig. 5 is a similar view, showing an intermediate stage in the descending or closing movement of the mechanism.

When the water-level in the cistern 3 falls, the weight of the bell 31 and that of the float 7 causes the levers 29 and 9 to descend. As this takes place, the trigger member 33a on the lower end 33 of the lever 29 comes to rest and presses upon the step 21a of the valve lever 21. By this means, the valve member 23 is held open, notwithstanding the lost motion provided between the float lever 9 and valve lever 21 by the extension 26 of the link 19. The valve member 23 continues to be so held open by the trigger member 33a (see Fig. 5) until the roller 16 and notch 35 have become re-engaged. Finally, as this re-engagement takes place, the trigger member 33a slips off the step 21a, and the valve member 23 descends completely into its closed position on the valve seat 25 (Fig. 1). This completes the restoration of the valve to its initial position, ready for refilling of the cistern 3, and the cycle of operations above described is repeated.

By using an inverted cup or bell 31, as distinct from an ordinary float, a greater impetus is given to the upthrust of the lever 29. This is due to the fact that the air trapped in the bell 31, and lightly compressed therein when the water rises, acts as a released compressed spring, to expedite the disengagement of the roller 16 and notch 35.

Moreover, by reason of the valve member 23 being positively prevented from closing by the trigger member 33a and step 21a until the float 7 has been locked in position by the re-engagement of the roller 16 and notch 35, it is ensured that the liquid in the cistern is completely or adequately discharged at the end of each flushing operation. More particularly, any tendency is thereby avoided for the valve member 23 (by reason of its prematurely closing and allowing the water-level to rise before the float 7 is relocked) to take up a position in which it remains open or partially open, and permits the water to enter and leave the cistern in a continuous trickle or stream, thereby bringing the functioning of the flushing valve to a standstill.

In manner known per se, the water-inlet 5 is provided with a stop-cock or valve (not shown). By regulation of this cock or valve, the rate of entry of water into the cistern 3 may be controlled, thereby enabling the time interval between the discharges or flushing operations to be varied.

The water-level $a$ in the cistern may be adjusted by providing an adjustable mounting for the air bell or auxiliary float 31 on the bent lever 29, whereby the height of the bell or float 31 can be varied.

Whilst our invention is referred to in the appended claims as a mechanism for operating the outlet valve of a tank, it is to be understood that the invention as so referred to is thereby claimed as applied also to other float operated mechanisms in which a valve or control member other than the outlet valve of a tank is operated by a float in similar manner.

We claim:

1. A mechanism for automatically and intermittently operating the outlet valve of a tank to which liquid is continuously supplied, comprising, in combination, a float provided in the tank, a float lever having the float connected to one end and pivotally supported between its ends in the tank, a counter-balancing weight connected to the end of the float lever remote from the float, an auxiliary float, an auxiliary lever pivotally supported between its ends in the tank and having the auxiliary float mounted on one of its ends at a level above the first-mentioned or main float, a trip element provided on the end of the float lever remote from the main float, a second trip element which is provided on the auxiliary lever as a complement to the first-mentioned trip element and which is engaged therewith while the tank is being filled up to the level of the auxiliary float and is disengaged therefrom so as to release the float lever and permit it to be abruptly lifted to its uppermost position by the pressure of the liquid on the main float, a valve lever pivotally supported between its ends in the tank and connected towards one end to the outlet valve, a link having one end extending upwards through and beyond the float lever and having its lower end connected to one end of the valve lever which is connected to the valve, an abutment provided on the upper end of the link against which, on disengagement of the trip elements, the float lever strikes and lifts the valve by means of the link and valve lever abruptly to its fully open position, a trigger mounted on the end of the auxiliary lever adjacent to the trip elements, and a step which is provided on the corresponding end of the valve lever remote from the link and which, on descent of the auxiliary and main floats consequent upon opening of the valve, is held by the said trigger so as to arrest final closure of the valve until the liquid in the tank is fully discharged.

2. A mechanism, according to claim 1 in which the first-mentioned trip element comprises a roller, a block provided on the end of the float lever remote from the float and having a vertical groove through which there depends the end of the auxiliary lever remote from the auxiliary float, and a pin mounted transversely at the outer end of the said groove whereon the said roller is supported; and in which the second trip element comprises a notched edge which is provided on the said depending end of the auxiliary lever and which, under the action of the weight of the auxiliary float, is caused displaceably to engage with, and be held by, the said roller.

3. A mechanism, according to claim 1, in which the auxiliary float comprises an inverted cup.

4. A mechanism, according to claim 1, in which the link is formed with an upward extension which, when the float lever and valve lever are in their lowermost positions, projects above the float lever and provides, on release of the trip elements and prior to the float lever striking the abutment of the link, a corresponding amount of lost motion between the float lever and link.

LESLIE CLEMENT BARLING.
GEORGE RUSSELL BEITH.

REFERENCES CITED

The following references are of record in the file of this patent:

UNITED STATES PATENTS

| Number | Name | Date |
| --- | --- | --- |
| 847,183 | Johnson | Mar. 12, 1907 |
| 1,426,203 | Leeberg | Aug. 15, 1922 |
| 2,007,453 | Lardner | July 9, 1935 |
| 2,526,294 | Stegeman | Oct. 17, 1950 |